United States Patent
Smith et al.

(10) Patent No.: US 10,417,007 B1
(45) Date of Patent: Sep. 17, 2019

(54) SYSTEMS, METHODS, AND COMPUTER READABLE MEDIA FOR UTILIZING A PLATFORM CONTROLLER DEVICE

(71) Applicant: VCE IP Holding Company LLC, Richardson, TX (US)

(72) Inventors: Gregory Lawrence Smith, Marlton, NJ (US); Alva Benjamin Eaton, Nottingham Park, IL (US); Samuel Maxwell Marrs, Bradley, IL (US); Nicholas Adams Hansen, Fuquay Varina, NC (US)

(73) Assignee: VCE IP Holding Company LLC, Richardson, TX (US)

( * ) Notice: Subject to any disclaimer, the term of this patent is extended or adjusted under 35 U.S.C. 154(b) by 85 days.

(21) Appl. No.: 15/395,810

(22) Filed: Dec. 30, 2016

(51) Int. Cl.
*G06F 9/4401* (2018.01)
*G06F 8/654* (2018.01)

(52) U.S. Cl.
CPC ............ *G06F 9/4401* (2013.01); *G06F 8/654* (2018.02)

(58) Field of Classification Search
CPC ......... G06F 9/4401; G06F 8/654; G06F 8/665
USPC .......................................................... 713/1
See application file for complete search history.

(56) References Cited

U.S. PATENT DOCUMENTS

| 9,449,171 | B2 | 9/2016 | Davis | |
| 2002/0087868 | A1* | 7/2002 | King | H04L 29/12839 713/185 |
| 2015/0082016 | A1* | 3/2015 | Bonczkowski | G06F 9/44505 713/100 |
| 2015/0312275 | A1* | 10/2015 | Grosskopf | H04L 63/20 726/1 |
| 2015/0370575 | A1* | 12/2015 | Tonry | G06F 21/10 713/2 |

OTHER PUBLICATIONS

Alateeq, "Design Secure Network Segmentation Approach," GIAC Security Essentials Certification (GSEC) Practical Assignment Version 1.4c, SANS Institute InfoSec Reading Room, pp. 1-23 (2005).
Schneider, "Least Privilege and More," Cornell University Department of Computer Science, pp. 209-213 (2003).
"Software Assurance: An Overview of Current Industry Best Practices," SAFECode, Software Assurance Forum for Excellence in Code, Driving Security and Integrity, pp. 1-20 (Feb. 2008).

* cited by examiner

*Primary Examiner* — Austin Hicks
(74) *Attorney, Agent, or Firm* — Jenkins, Wilson, Taylor & Hunt P.A.

(57) ABSTRACT

Methods, systems, and computer readable mediums for utilizing a platform controller device are disclosed. According to one method, the method includes obtaining, by a platform controller device in a computing system cabinet, identification data for each of a plurality of computing system components included in the computing system cabinet. The method further includes acquiring, upon the insertion of a removable memory device into the platform controller device, system configuration profile data that is stored on the removable memory device and includes component configuration data corresponding to each of the plurality of computing system components. The method also includes utilizing the identification data and the component configuration data to configure each of the computing system components in accordance to the system configuration profile data.

17 Claims, 4 Drawing Sheets

SYSTEMS, METHODS, AND COMPUTER READABLE MEDIA FOR UTILIZING A PLATFORM CONTROLLER DEVICE

TECHNICAL FIELD

The subject matter described herein relates to managing computing system components in converged integration (CI) computing systems. More specifically, the subject matter relates to devices, systems, and methods for utilizing a platform controller device.

BACKGROUND

At present, there is considerable demand for converged integration systems to be designed as immediately operable appliance upon delivery to a customer site. Computing systems, such as converged infrastructure (CI) computing systems, are designed, built, and logically configured for the customer along with all of the licensing and protocols that facilitate the operation of the CI computing system. Most CI computing systems are built and shipped to the customer's deployment site of the customer, who is then compelled to wait for a trained technician to manually install and configure the CI computing system. Notably, problems arise during the sign-off of the completed delivery of the CI system or upon bringing the CI system online. Consequently, a significant amount of time may be needed from the computing system operator to locate system-level defaults or for deploying the correct technician to the customer site in order to resolve the issues.

SUMMARY

In accordance with this disclosure, methods, systems, and computer readable mediums for utilizing a platform controller device are disclosed. According to one embodiment, the method includes obtaining, by a platform controller device in a computing system cabinet, identification data for each of a plurality of computing system components included in the computing system cabinet. The method further includes acquiring, upon the insertion of a removable memory device into the platform controller device, system configuration profile data that is stored on the removable memory device and includes component configuration data corresponding to each of the plurality of computing system components. The method also includes utilizing the identification data and the component configuration data to configure each of the computing system components in accordance to the system configuration profile data.

BRIEF DESCRIPTION OF THE DRAWINGS

The subject matter described herein will now be explained with reference to the accompanying drawings of which.

DETAILED DESCRIPTION

The subject matter described herein discloses methods, systems, and computer readable mediums for utilizing a platform controller device. As indicated above, current industry demands include converged infrastructure (CI) computing systems (e.g., systems that include network, storage, and compute components) that promptly function as turnkey applications upon delivery. CI computing systems are designed, constructed, and logically configured to further include all of the requisite licensing and protocols needed by the system to operate. In some instances, a computing system cabinet, such as an Intelligent Physical Infrastructure (IPI) Cabinet, is equipped with an on-board monitoring system (e.g., an IPI interface board) that is integral of the cabinet and is designed to utilize sensor devices to monitor the cabinet's power consumption, thermal measurements, pressure measurements, humidity levels, and the like. The IPI interface board may monitor the computing system for status data based on a time interval that can keep track of overall health of the CI computing system at each cabinet level (e.g., each component elevation level). In many instances, licensing information for each computing system component resides on a separate server device and contains all the protocols and license information corresponding to the software/firmware used to facilitate the CI computing system. By maintaining licensing data in two separate locations, it becomes difficult to upgrade and manage the computing system and its components during its service. Furthermore, most systems are built and deployed to the customer who is compelled to wait for a trained technician responsible for installing the CI computing system. In addition, these technical problems can occur during the signoff of a completed delivery of the computing system or bringing the CI system on-line. Such problems may result in the consumption of large amounts of time to track down system level defaults or bringing the appropriate technician to the customer's deployment site to resolve this issue. The disclosed subject matter as presented below affords an efficient way to eliminate these issues.

As described herein, the disclosed subject matter presents a platform controller device (e.g., a Platform Controller IPI Cabinet (PCIC) device) that is utilized in CI computing system platforms. The disclosed platform controller device combines an IPI interface board with a server device (e.g., a minicomputer device) that is configured to manage and orchestrate all the issues presented above. In some embodiments, the platform controller device is an on-board computer that can execute applications to confirm what components are contained in the computing system cabinet (e.g., the CI IPI Cabinet) at each component elevation level (e.g., vertical position in the chassis of a rack-mounted device). The platform controller may be configured to monitor, report, and communicate with other platform controllers and/or communicate reports to the computing system manager (e.g., Vision application) to create a complete dashboard control from a single point of entry. In some instances, the platform controller device may feature a removable server device (e.g., a management controller device) that houses a local memory device (e.g., an on-board microSD card) as well as a removable memory device (e.g., a removable microSD card that is inserted into the platform controller). The report information obtained via the interface board as outlined above may either be stored on the local memory device and/or copied to the removable memory device, if need. The platform controller device further allows the ability to remove the platform controller device from the computing system cabinet, or alternatively, the memory device from the platform controller.

In some embodiments, the removable memory device can be provisioned by a computing system manufacturing entity with licensing and warranty information for all of the equipment (i.e., the computing system components) installed in the computing system cabinet. This allows the computing system to be configured in the factory and a system configuration profile to be stored on the local memory device, which may be shipped to the customer site separately from the CI computing system itself. Another feature afforded by the disclosed subject matter is that a unique system configuration profile can be saved/managed internally (e.g., by the computing system manufacturing/assembling entity) for each customer's deployed computing system(s). For installation of a deployed CI computing system, a technician can visit the deployment site and install the removable memory device (e.g., a microSD card) to boot up the computing system. All of the software and/or firmware applications preloaded on the CI computing system and corresponding licensing data files will load at boot up and establish a factory configured CI computing system in accordance to the loaded system configuration profile. Likewise, upgrades to an existing computing system can easily be performed by sending a customer a new version of the removable memory device preloaded with the latest firmware and software revisions (and/or licensing data files) that have been specifically designed by the computing system manufacturing/assembling entity for the customer's CI computing system. Notably, the customer's operator can install the removable memory device in the platform controller and reboot the system and all of the computing system components in the computing system cabinet will be refreshed to the latest version of firmware and software. In the event a customer wishes to revert to the original system configuration profile initially installed, the original removable memory device may be inserted to initiate the same process of rebooting with the desired revision level and configuration for the CI computing system.

As described herein, a computing system can include one or more computing platforms comprising one or more computing system components (CSCs), such as compute components, software components, network components, switching components, storage components, hardware components, firmware components, and/or other elements. In some embodiments, an exemplary computing system can comprise any computing system and/or device that utilizes one or more processors and memory, such as an integrated infrastructure (which may include a plurality of compute components, each of which includes one or more processors and memory). One exemplary integrated infrastructure is a converged infrastructure (CI) computing system, such as, for example, a Vblock™ System. A CI computing system can comprise multiple CSCs (e.g., components, physical resources and/or virtual resources) in a preconfigured or prepackaged computing platform, where some CSCs are developed and/or manufactured by multiple entities. For example, an exemplary CI computing system can comprise data storage devices, compute servers, network equipment, and software for managing physical resources and/or virtualized resources (e.g., virtual servers). Any computing system, such as a CI computing system, and integrated infrastructure system, or computing device may be utilized without departing from the scope of the present subject matter.

Reference will now be made in detail to exemplary embodiments of the subject matter described herein, examples of which are illustrated in the accompanying drawings. Wherever possible, the same reference numbers will be used throughout the drawings to refer to the same or like parts.

Figure 1:
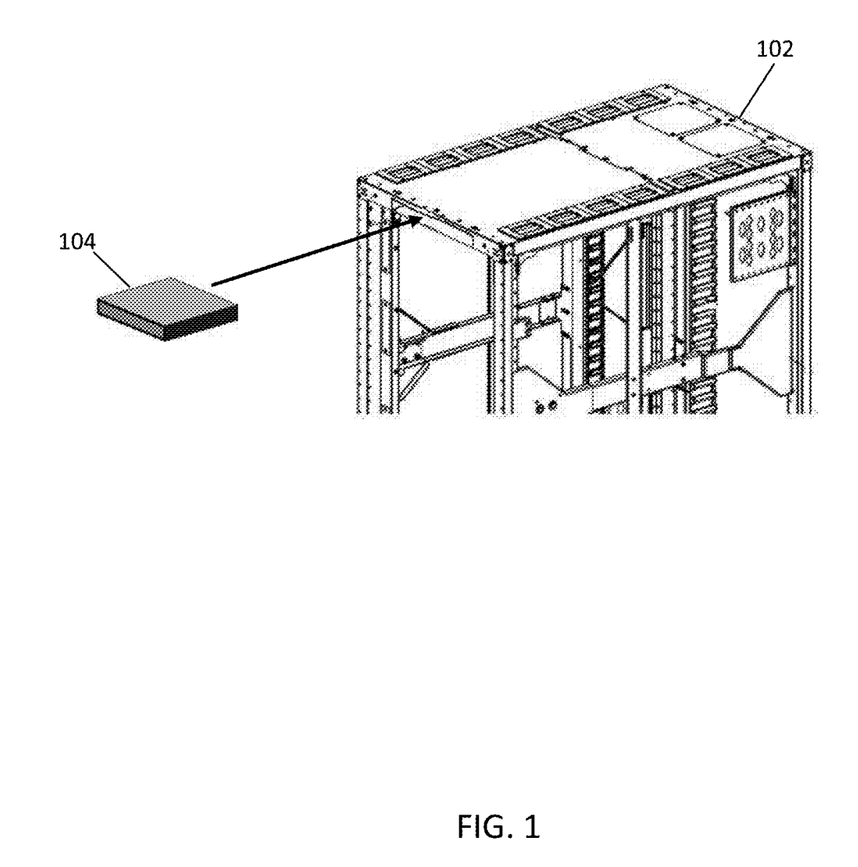
FIG. 1 is a block diagram illustrating an exemplary computing system cabinet device in accordance to embodiments of the subject matter disclosed herein.

FIG. 1 depicts a computing system cabinet 102 that comprises a rack-mounted chassis system that is configured to physically contain and support a plurality of computing system components. For example, computing system cabinet 102 may be adapted to receive inserted and/or installed compute components, network components, and storage components that are configured to collectively function as a CI computing system (as described above). Further, computing system cabinet 102 may be designed and/or adapted to receive an inserted platform controller device 104. The internal components and elements of platform controller device 104 are described below and shown in FIG. 2. Notably, platform controller device 104 may be a removable component that is capable of being inserted and/or fitted into computing system cabinet 102.

Figure 2:
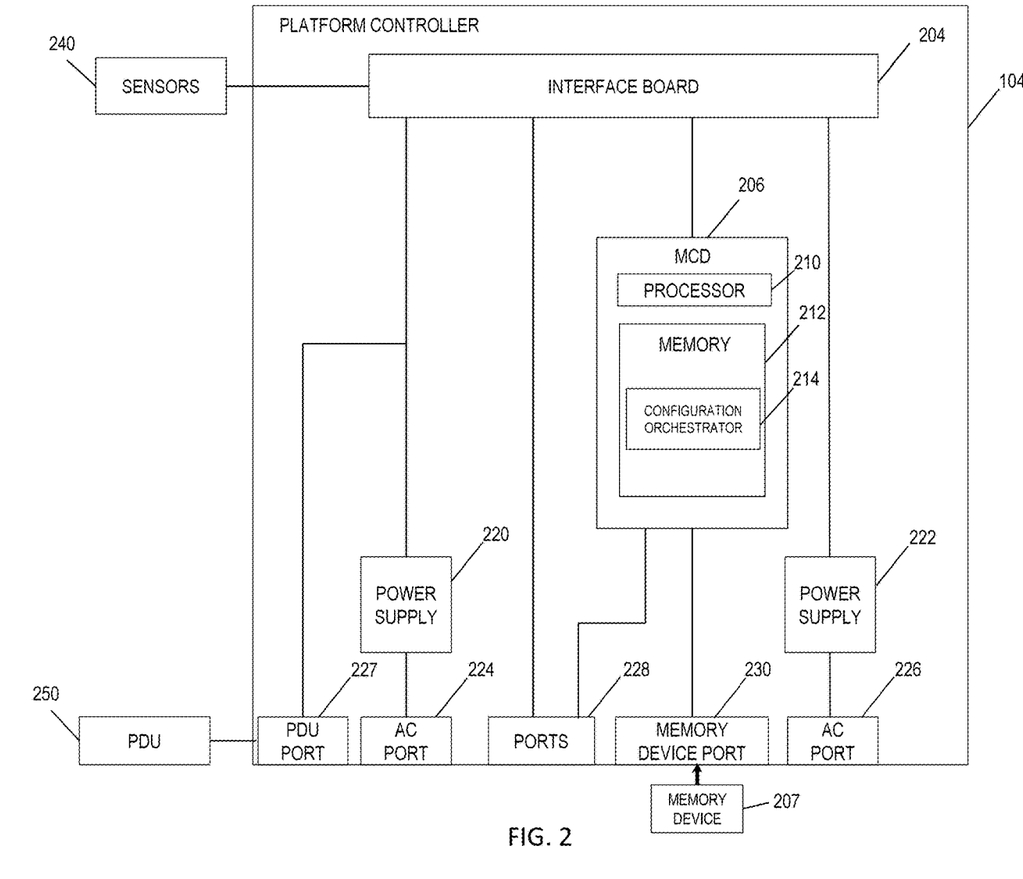
FIG. 2 is a logical block diagram illustrating an exemplary platform controller device in accordance with embodiments of the subject matter disclosed herein.

FIG. 2 depicts a logical block diagram of platform controller device 104. In some embodiments, platform controller device 104 is a platform controller intelligent physical infrastructure (IPI) cabinet (PCIC) device. As shown in FIG. 2, platform controller device 104 may comprise a self-contained device that includes an interface board 204 (e.g., an IPI interface board), a management controller device (MCD) 206 (e.g., local server device), power supplies 220-222, and a plurality of hardware connection ports 224-232. In some embodiments, management controller device (MCD) 206 is a hardware-computing device, such as mini-computer or microcomputer. In some embodiments, the ports supported by platform controller device 104 include alternating current (AC) power ports 224-226, port bank 228, removable memory device port 230, an HDMI port 232, and a power distribution (PDU) port 227. In some embodiments, port bank 228 may represent a number of different communication ports, each capable of communicating via a different interface protocols, such as USB, HDMI, RS485, RS232, Ethernet, RJ-45, and the like. Notably, ports 227-230 allow management controller device 206 to communicatively connect to computing system components either directly or via interface board 204. Further, platform controller device 104 includes removable memory device port 230 that is configured to receive an inserted removable memory device 207. In some examples, removable memory device 207 may comprise a hard disk drive (HDD) device, a solid state driver (SSD) device, a removable flash memory drive device (e.g., micro SD card), or any like portable storage device that is capable of being provisioned with system configuration profile data.

As shown in FIG. 2, management controller device 206 includes a processor 210 and a local memory device 212. In some embodiments, processor 210 comprises a microprocessor, such as a central processing unit (CPU), or any other hardware-based processor unit. Local memory device 212 may include a random access memory (RAM), a read only memory (ROM), a cache memory, a magnetic read/write memory, a flash memory (e.g., a microSD card), or any other non-transitory storage media. In some examples, local memory device 212 is utilized to store the operating system (OS) files for management controller device 206. In some examples, memory device 212 may be configured to store software and firmware license data files (i.e., licenses) for each of the components residing in the host computing system. More specifically, memory device 238 may contain all of the protocols and licenses for software and firmware utilized by the computing system components in cabinet 102. Notably, the stored licenses and protocols enable the associated components to function as a single CI computing system.

In some examples, local memory device 212 further includes a configuration orchestrator 214, which may comprise an algorithm that is embodied as a software module. Notably, configuration orchestrator 214 may be configured to manage and orchestrate a system configuration profile corresponding to the host computing system. For example, configuration orchestrator 214 may be adapted to recognize and access memory device 207 in the event the removable memory device is inserted into memory device port 230. Although FIG. 2 depicts the memory device port 230 and the management controller device 206 communicatively linked, memory device port 230 may be positioned on and/or integrated with management controller device 206 without departing from the scope of the disclosed subject matter.

In some embodiments, configuration orchestrator 214 will require a password before accessing the memory device 207 and/or utilizing the stored system configuration profile data. Further, configuration orchestrator 214 may obtain licensing file data (such as component licensing data files, software licensing data files, firmware licensing data files), warranty data files, software revision/version information (e.g., software update file data), software application files, and/or the like from memory device 207. Based on the information obtained from memory device 207, configuration orchestrator 214 may initiate a system boot-up process and/or a system configuration process in accordance to the stored system configuration profile data. Such system processes are described below in more detail (e.g., method 400 in FIG. 4).

In some examples, management controller device 206 is communicatively connected to interface board 204. For example, management controller device 206 may be physically coupled to interface board 204 via a direct Ethernet connection. Interface board 204 is a platform controller element that is configured to facilitate the on-board monitoring of the host computing system cabinet and the computing system itself. In some examples, interface board 204 serves as a bridging and/or switching device logically positioned between management controller device 206 and the computing system components residing in cabinet 102. As shown in FIG. 2, interface board 204 is connected to a plurality of ports 227-230, which in turn serve as a connection point to each of the computing system components in cabinet 102.

As indicated above, interface board 204 is configured to function as an onboard monitoring system for the computing system cabinet. In some embodiments, interface board 204 is integral to the cabinet and includes one or more sensors or gauges that are configured to monitor parameters associated with the cabinet, such as power consumption, thermal, pressure, and moisture levels. Interface board 204 may be configured to monitor the computing system cabinet for status based on the time interval that keeps track of the overall health of the computing system at each level of the cabinet. For example, interface board 204 may be connected to one or more sensors 240. As depicted in FIG. 2, sensors 240 may represent a plurality of sensors that includes thermometers, humidity detectors, pressure gauges, power consumption meters, and the like. Although FIG. 2 illustrates a logical representation, it is understood that the various sensors represented by sensors 240 may be strategically distributed within cabinet 102. For example, each elevation or rack level may be equipped with a dedicated thermometer, hygrometer, barometer, and/or power consumption sensor so as to measure and capture data at each elevation or rack level (or for each computing system component) in cabinet 102.

In some embodiments, interface board 204 may also be connected via port 234 to a power distribution unit (PDU) 250. PDU 250 is a component that is located in computing system cabinet 102 and is responsible for distributing power to connected computing system components within cabinet 102. Based on status information captured by sensors 240, interface board 204 and/or management controller device 206 may be configured to adjust (e.g., increase, decrease, cease, etc.) the power level provided to the computing system component exhibiting problems. Such adjustments maybe performed in accordance to profile parameters or metrics maintained by configuration orchestrator 214.

Figure 3:
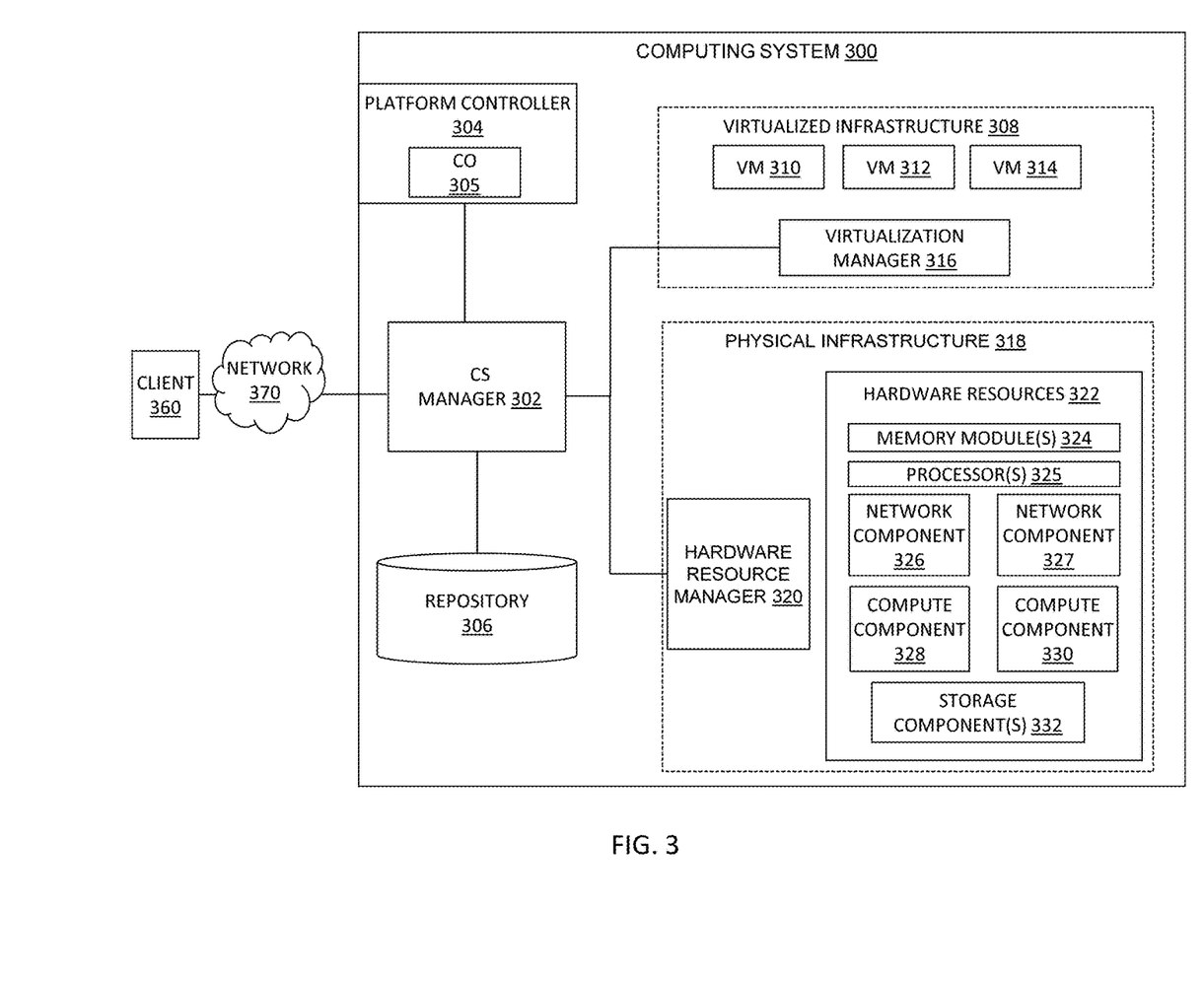
FIG. 3 is a logical block diagram illustrating an exemplary computing system equipped with a platform controller device in accordance with embodiments of the subject matter disclosed herein.

FIG. 3 is a block diagram illustrating an exemplary CI computing system 300 according to an embodiment of the subject matter described herein. Although the following disclosure describes the use of CI computing system 300, any type of computer system can be utilized without departing from the scope of the present subject matter. CI computing system 300 can comprise computing system components that comprise physical resources that may include one or more of a compute component, a network component, a storage component, a server, network equipment, a router, a switch, wiring or cabling, a storage device, a physical port, and/or a communications interface. CI computing system 300 can also comprise software and related components for managing the CI computing system and/or the computing system components therein. In some embodiments, CI computing system 300 can be configured to provide data management functionality, cloud service functionality, and/or other functionality. CI computing system 300 can be capable of communicating with other CI computing systems (e.g., located at various physical locations or sites) and can communicate with various other entities, such as network nodes (e.g., servers hosting online sites) and users.

In some embodiments, CI computing system 300 can comprise a CS manager 302, a platform controller device 304, virtualized infrastructure 308, and/or physical infrastructure 318. CS manager 302 can be any suitable entity for managing aspects of CI computing system 300 or portions therein (e.g., computing system components). In general, CS manager 302 can be configured to manage performance, resource utilization levels, and other aspects associated with virtualized infrastructure 308 and/or physical infrastructure 318. In some embodiments, CS manager 302 can comprise the Vision™ Intelligent Operations software and/or firmware. Notably, CS manager 302 can also be configured to query and/or access each computing system component within CI computing system 300 and subsequently provide relevant identification information to platform controller device 304. In some embodiments, platform controller device 304 includes a configuration orchestrator 305, which may be similar to configuration orchestrator 214 as described above with regard to FIG. 2.

As shown in FIG. 3, platform controller device 304 may be communicatively connected to CS manager 302. Notably, platform controller device 304 may represent the same platform controller device 104 as depicted in each of FIG. 1 and FIG. 2. In some embodiments, platform controller device 304 may be configured to request component identification data from CS manager 302. As described above, CS manager 302 is configured to obtain component identification data via connections to hardware resource manager 320. Alternatively, platform controller device 304 may be coupled to each of the computing system components 326-332 and/or hardware resource manager 320 (e.g., via port bank 228 and interface board 204 shown in FIG. 2).

Virtualized infrastructure 308 can comprise a virtualization environment configured to simulate components of a computing device, such as a processor, system memory, and a storage device, for executing one or more virtual machines (VMs) (e.g., VM 310, VM 312, and VM 314). In some embodiments, virtualization manager 316 can allow logical entities to be created, deleted, or modified using an API and/or a GUI. Virtualization manager 316 can be any suitable entity (e.g., software executing in a virtual machine) for managing aspects associated with virtualized infrastructure 308. In some embodiments, virtualization manager 316 can be configured for providing data management via one or more communications interfaces.

Physical infrastructure 318 can comprise hardware resources 322, such as network components 326-327, compute components 328-330, and storage components 332 (e.g., functioning as a storage area network (SAN)). Notably, network components 326-327, compute components 328-330, storage components 332, and other like computing system components may be physically installed in a computing system cabinet, not unlike cabinet 102 shown in FIG. 1. The computing system components can also be configured for use by one or more virtual entities. For example, compute component 328 and storage component 332 may be used in implementing VM 310 and VM 312 while compute component 130 and storage component 334 may be used in implementing VM 314 and virtualization manager 316. In some embodiments, network components 326-327 (e.g., network switches) may be configured to enable communication between the components in CI computing system 300. In some embodiments, one or more file share storage (FSS) systems (not shown) can be utilized to provide file system level access to a CI computing system across a local area network (LAN).

Hardware resource manager 320 can be any suitable entity (e.g., software executed by processor 325 or software executing in a virtual machine) for managing aspects associated with physical infrastructure 318. In some embodiments, hardware resource manager 320 can be configured to provision hardware resources 322 via one or more communications interfaces. For example, hardware resource manager 320 can provision hardware resources 322 for implementing one or more virtual entities in virtualized infrastructure 308. In some embodiments, hardware resource manager 320 can comprise any management component or entity, such as a unified infrastructure manager (UIM) or a unified computing system (UCS) director entity, which is configured to provision the physical hardware of CI computing system 300.

Figure 4:
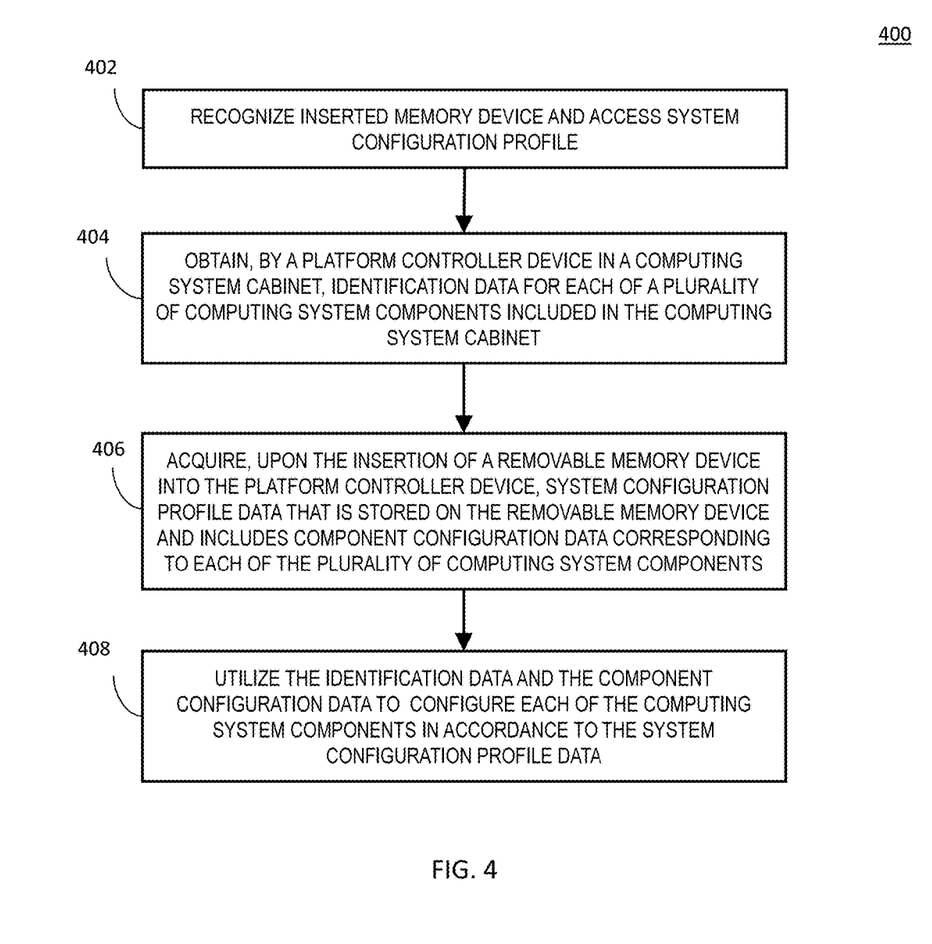
FIG. 4 illustrates a flow chart of an exemplary method for utilizing a platform controller device in accordance with embodiments of the subject matter disclosed herein.

FIG. 4 illustrates a flow chart of an exemplary method 400 for utilizing a platform controller device in accordance with embodiments of the subject matter disclosed herein. The management controller device 206 as shown in FIG. 2 can perform the method 400. For purposes of illustration, the method 400 will be described with reference to a management controller device that performs the method 400. Prior to the execution of method 400, a system configuration profile is loaded on a removable memory device. In some embodiments, a manufacturer/assembler of a computing system catalogs each of the hardware components and software components that are provisioned within a computing system cabinet to be delivered to a customer. Afterwards, the manufacturer may collect all the licensing files corresponding to the identified hardware and software components in the computing system and subsequently store the licensing files as part of the system configuration profile data on a removable memory device (e.g., memory device 207 shown in FIG. 2).

Once the computing system is delivered to the customer site, the removable memory device is inserted into a platform controller device contained in the computing system cabinet. For example, after being provisioned with the system configuration profile mentioned above, the removable memory device is transported from the computing system manufacturer site to the customer site location housing the computing system. Specifically, the removable memory device is inserted into a media device port of the platform controller.

In step 402 of method 400, identification data for each of the computing system components contained in the cabinet are obtained. In some examples, a configuration orchestrator in the platform controller device is configured to send an inquiry to a computing system manager to request identification data identifying the computing system components residing in the cabinet. After obtaining the component identification information from a hardware resource manager in the computing system, the computing system manager forwards the component identification information to the management controller device on the platform controller device. Alternatively, the management controller device may send a query message directly to each of the computing system components via the local interface board, which establishes and maintains communicative connections with the computing system components through one or more ports on the platform controller device. In response to receiving the component identification information (e.g., serial number or identifier) from each of the computing system components, the management controller device may store the identification information in memory (e.g., memory 212 in FIG. 2)

In step 404, system configuration profile data that is stored on the removable memory device is acquired upon the insertion of a removable memory device. In some embodiments, the management controller device receives a notification message or signal from the removable memory device indicating that the memory device (e.g., memory device 207) is inserted into a memory device port that is communicatively connected to a management controller device. In response to the notification, the management controller device may be configured to access the system configuration profile. In some embodiments, the management controller device is configured to access the removable memory device upon receiving a password or input key after the removable memory device is inserted.

In step 406, the computing system components are configured in accordance to the system configuration profile. In some examples, management controller device compares the identification information associated with the computing system components that reside in the cabinet with the system configuration profile. After the management controller device determines that the system configuration profile corresponds to the identified computing system components in the cabinet, the management controller device provides the configuration data (e.g., software updates, firmware updates, licensing information, etc.) to the appropriate components for updating.

It should be noted that the platform controller (e.g., platform controller 104 and 304), configuration orchestrator (e.g., configuration orchestrator 214 and 305), and/or functionality described herein may constitute a special purpose computing device. Further, the described platform controller, configuration orchestrator, and/or functionality described herein can improve the technological field of monitoring and managing the cabinet containing a computing system, such as a CI computing system. Namely, the described platform controller, configuration orchestrator, and/or functionality described herein can improve the technological field of computing system management by providing an on-board monitoring system that can be configured in accordance to an inserted removable memory device that stores a predefined system configuration profile, which can be customized based on the components and/or elements contained in the computing system cabinet.

As indicated above, the subject matter disclosed herein can be implemented in software in combination with hardware and/or firmware. For example, subject matter described herein can be implemented in software executed by a processor. In some exemplary implementations, the subject matter described herein can be implemented using a computer readable medium having stored thereon computer executable instructions (e.g., software algorithm), which when executed by a processor of a computer, cause the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be embodied as the configuration orchestrator. As used in the disclosed subject matter, the terms "function" or "module" refer to hardware, firmware, or software in combination with hardware and/or firmware for implementing features described herein.

Various combinations and sub-combinations of the structures and features described herein are contemplated and will be apparent to a skilled person having knowledge of this disclosure. Any of the various features and elements as disclosed herein can be combined with one or more other disclosed features and elements unless indicated to the contrary herein. Correspondingly, the subject matter as hereinafter claimed is intended to be broadly construed and interpreted, including all such variations, modifications and alternative embodiments, within its scope and including equivalents of the claims. It is understood that various details of the presently disclosed subject matter may be changed without departing from the scope of the presently disclosed subject matter. Furthermore, the foregoing description is for the purpose of illustration only, and not for the purpose of limitation.

What is claimed is:

1. A method comprising:
    obtaining, by a platform controller device in a computing system cabinet, identification data for each of a plurality of computing system components included in the computing system cabinet, wherein the platform controller device is a self-contained device that is adapted to be removed from and inserted into the computing system cabinet;
    acquiring, upon an insertion of a removable memory device into the platform controller device, system configuration profile data that is stored on the removable memory device and includes component configuration data corresponding to each of the plurality of computing system components, wherein the system configuration profile data stored on the removable memory device includes licensing data files that correspond to each of the plurality of computing system components, wherein a configuration orchestrator included in the platform controller device is configured to initiate a boot up process of the computing system components in accordance to the system configuration profile data upon an insertion of the removable memory device into the platform controller device; and
    utilizing the identification data and the component configuration data to configure each of the computing system components in accordance to the system configuration profile data.

2. The method of claim 1 wherein the computing system cabinet houses a converged infrastructure (CI) computing system that comprises compute components, storage components, and network components.

3. The method of claim 1 wherein the removable memory device includes a flash memory drive device, a solid state drive (SSD) device, or a hard disk drive (HDD) device.

4. The method of claim 1 wherein the system configuration profile data further includes one or more of software update file data and firmware update file data corresponding to one or more of the plurality of computing system components.

5. The method of claim 1 wherein the platform controller device is configured to manage a plurality of sensor devices located within the computing system cabinet.

6. The method of claim 1 wherein the system configuration profile data is acquired from the removable memory device in response to receiving a password or key.

7. A system comprising:
    a computing system cabinet; and
    a platform controller device in the computer system cabinet that is configured to:
    obtain identification data for each of a plurality of computing system components included in the computing system cabinet, wherein the platform controller device is a self-contained device that is adapted to be removed from and inserted into the computing system cabinet;
    acquiring, upon an insertion of a removable memory device into the platform controller device, system configuration profile data that is stored on the removable memory device and includes component configuration data corresponding to each of the plurality of computing system components wherein the system configuration profile data stored on the removable memory device includes licensing data files that correspond to each of the plurality of computing system components, wherein a configuration orchestrator included in the platform controller device is configured to initiate a boot up process of the computing system components in accordance to the system configuration profile data upon an insertion of the removable memory device into the platform controller device; and
    utilize the identification data and the component configuration data to configure each of the computing system components in accordance to the system configuration profile data.

8. The system of claim 7 wherein the computing system cabinet houses a converged infrastructure (CI) computing system that comprises compute components, storage components, and network components.

9. The system of claim 7 wherein the removable memory device includes a flash memory drive device, a solid state drive (SSD) device, or a hard disk drive (HDD) device.

10. The system of claim 7 wherein the system configuration profile data further includes one or more of software update file data and firmware update file data corresponding to one or more of the plurality of computing system components.

11. The system of claim 7 wherein the platform controller device is configured to manage a plurality of sensor devices located within the computing system cabinet.

12. The system of claim 7 wherein the system configuration profile data is acquired from the removable memory device in response to receiving a password or key.

13. A non-transitory computer readable medium having stored thereon executable instructions that when executed by a processor of a computer control the computer to perform steps comprising:
  obtaining, by a platform controller device in a computing system cabinet, identification data for each of a plurality of computing system components included in the computing system cabinet, wherein the platform controller device is a self-contained device that is adapted to be removed from and inserted into the computing system cabinet;
  acquiring, upon an insertion of a removable memory device into the platform controller device, system configuration profile data that is stored on the removable memory device and includes component configuration data corresponding to each of the plurality of computing system components wherein the system configuration profile data stored on the removable memory device includes licensing data files that correspond to each of the plurality of computing system components, wherein a configuration orchestrator included in the platform controller device is configured to initiate a boot up process of the computing system components in accordance to the system configuration profile data upon an insertion of the removable memory device into the platform controller device; and
  utilizing the identification data and the component configuration data to configure each of the computing system components in accordance to the system configuration profile data.

14. The non-transitory computer readable medium of claim 13 wherein the computing system cabinet houses a converged infrastructure (CI) computing system that comprises compute components, storage components, and network components.

15. The non-transitory computer readable medium of claim 13 wherein the removable memory device includes a flash memory drive device, a solid state drive (SSD) device, or a hard disk drive (HDD) device.

16. The non-transitory computer readable medium of claim 13 wherein the system configuration profile data further includes one or more of software update file data and firmware update file data corresponding to one or more of the plurality of computing system components.

17. The non-transitory computer readable medium of claim 13 wherein the platform controller device is configured to manage a plurality of sensor devices located within the computing system cabinet.

* * * * *